United States Patent
Conti

(10) Patent No.: US 7,669,243 B2
(45) Date of Patent: Feb. 23, 2010

(54) METHOD AND SYSTEM FOR DETECTION AND NEUTRALIZATION OF BUFFER OVERFLOW ATTACKS

(75) Inventor: Gregory R. Conti, Saint Paul (FR)

(73) Assignee: Texas Instruments Incorporated, Dallas, TX (US)

( * ) Notice: Subject to any disclaimer, the term of this patent is extended or adjusted under 35 U.S.C. 154(b) by 760 days.

(21) Appl. No.: 11/199,427

(22) Filed: Aug. 8, 2005

(65) Prior Publication Data

US 2006/0225134 A1    Oct. 5, 2006

(30) Foreign Application Priority Data

Mar. 31, 2005    (EP)    ................. 05290731

(51) Int. Cl.
  *G06F 11/00* (2006.01)
  *H04L 9/32* (2006.01)
  *H04L 9/00* (2006.01)
(52) U.S. Cl. .................. 726/22; 726/23; 726/24; 726/25; 726/26; 726/27; 713/164; 713/165; 713/166; 713/167
(58) Field of Classification Search ............ 726/22
  See application file for complete search history.

(56) References Cited

U.S. PATENT DOCUMENTS

| | | | |
|---|---|---|---|
| 6,832,302 B1 | 12/2004 | Fetzer et al. | |
| 6,993,663 B1 * | 1/2006 | Paya et al. | 711/163 |
| 6,996,677 B2 * | 2/2006 | Lee et al. | 711/132 |
| 2003/0014667 A1 | 1/2003 | Kolichtchak | |
| 2004/0103252 A1 | 5/2004 | Lee et al. | |
| 2004/0133777 A1 | 7/2004 | Kiriansky et al. | |
| 2004/0250105 A1 | 12/2004 | Molnar | |

OTHER PUBLICATIONS

"Buffer Overflows for Dummies", Josef Nelissen: Internet, 'Online', Mya 1, 2002, pp. 1-27, XP002329589, Retrieved from the Internet: URL:hppt://www.sans.org/rr/papers/60/481.pdf>, 'retrieved on May 26, 2005.

* cited by examiner

*Primary Examiner*—Longbit Chai
(74) *Attorney, Agent, or Firm*—Ronald O. Neerings; Wade James Brady, III; Frederick J. Telecky, Jr.

(57) ABSTRACT

A method for detecting a stack buffer overflow attack is provided that includes receiving a memory access request from a processor core of a system, and determining that the memory access request indicates a stack buffer overflow attack. The method may further include preventing completion of the memory access request and/or executing a security violation response. A system is also provided that includes a processor core coupled to a plurality of busses and an execution stack in a random access memory coupled to the plurality of busses. The system further includes a buffer overflow protection (BOP) logic coupled to the plurality of busses to receive memory access requests from the plurality of busses. The BOP logic is operable to detect a buffer overflow attack comprising a memory access request addressing the execution stack initiated by a program executing on the processor core.

30 Claims, 2 Drawing Sheets

METHOD AND SYSTEM FOR DETECTION AND NEUTRALIZATION OF BUFFER OVERFLOW ATTACKS

This application claims priority under 35 USC § (e)(1) of European Application Number 05290731.8, filed on 31 Mar. 2005.

BACKGROUND

Mobile electronic devices such as personal digital assistants (PDAs) and digital cellular telephones are increasingly used for electronic commerce (e-commerce) and mobile commerce (m-commerce). Programs that execute on the mobile devices to implement e-commerce and/or m-commerce functionality may need to operate in a secure mode to reduce the likelihood of attacks by malicious programs (e.g., virus programs) and to protect sensitive data.

For security reasons, at least some processors provide two levels of operating privilege: a first level of privilege for user programs; and a higher level of privilege for use by the operating system. The higher level of privilege may or may not provide adequate security, however, for m-commerce and e-commerce, given that this higher level relies on proper operation of operating systems with highly publicized vulnerabilities. In order to address security concerns, some mobile equipment manufacturers implement yet another third level of privilege, or secure mode, that places less reliance on corruptible operating system programs, and more reliance on hardware-based monitoring and control of the secure mode. An example of one such system may be found in U.S. Patent Publication No. 2003/0140245, entitled "Secure Mode for Processors Supporting MMU and Interrupts."

In addition to this secure mode, various hardware-implemented security firewalls and other security monitoring components have been added to the processing systems used in mobile electronic devices to further reduce the vulnerability to attacks. Examples of these security improvements may be found in U.S. patent application Ser. No. 10/961,756, entitled "System and Method for Secure Mode for Processors and Memories on Multiple Semiconductor Dies Within a Single Semiconductor Package," Ser. No. 10/961,755, entitled "Method and System of Ensuring Integrity of a Secure Mode Entry Sequence," Ser. No. 10/961,344, entitled "System and Method of Identifying and Preventing Security Violations Within a Computing System," Ser. No. 10/961,748, entitled "Method and System of Verifying Proper Execution of a Secure Mode Entry Sequence," and European Patent Application EP 04292405.0, entitled "Method and System for Detecting a Security Violation Using an Error Correction Code," all of which are hereby incorporated by reference.

Despite this addition of security protection in the processing hardware, mobile electronic devices still remain vulnerable to a very common software security attack known generically as "stack buffer overflow." In a stack buffer overflow attack, executable code is written on an execution stack and the return address of a currently executing function is modified so that it will point to the beginning of this new code. Then, when the function call returns, the attacker's code is executed rather than returning to the calling function.

SUMMARY

Accordingly, there are disclosed herein systems and methods for detecting and neutralizing a stack buffer overflow attack. Embodiments provide a method for detecting a stack buffer overflow attack that includes receiving a memory access request from a processor core of a system, and determining that the memory access request indicates a stack buffer overflow attack. The method may further include preventing completion of the memory access request and/or executing a security violation response.

In other embodiments, a system is provided that includes a processor core coupled to a plurality of busses and an execution stack in a random access memory coupled to the plurality of busses. The system further includes a buffer overflow protection (BOP) logic coupled to the plurality of busses to memory access requests from the plurality of busses. The BOP logic is operable to detect a buffer overflow attack comprising a memory access request addressing the execution stack initiated by a program executing on the processor core.

Other embodiments provide a buffer overflow protection (BOP) apparatus that includes address range comparator logic coupled to a plurality of busses of a processor core to receive a memory access request from a program executing on the processor core. The BOP apparatus also includes violation generator logic coupled to the address comparator to receive a notification of a security violation. The address comparator logic sends the notification to the violation generator logic if the memory access request comprises an instruction fetch request addressing an execution stack.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Inasmuch as the systems and methods described herein were developed in the context of a mobile computing system, the description herein is based on a mobile computing environment. However, the discussion of the various systems and methods in relation to a mobile computing environment should not be construed as a limitation as to the applicability of the systems and methods described herein to only mobile computing environments.

Figure 1:
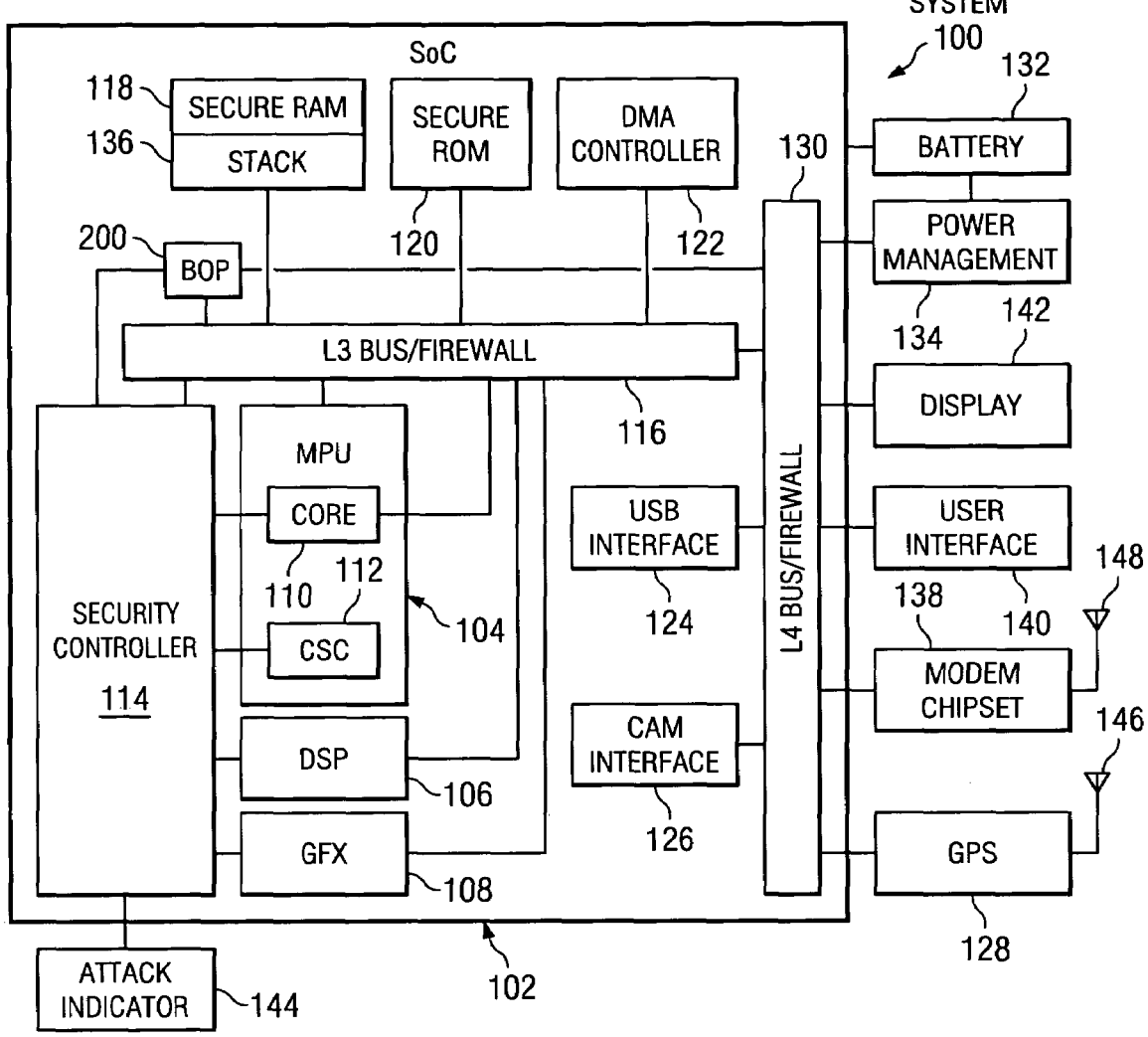
FIG. 1 shows a system in accordance with one or more embodiments.

FIG. 1 shows a system 100 constructed in accordance with one or more embodiments of the invention. In accordance with at least some embodiments, the system 100 may be a mobile device such as a cellular telephone, personal digital assistant (PDA), text messaging system, and/or a device that combines the functionality of a messaging system, personal digital assistant and a cellular telephone.

The system 100 includes a multiprocessing unit (MPU) 104 coupled to various other system components by way of data and instruction busses and security firewalls (e.g., L3 bus/firewall 116, and L4 bus/firewall 130). The MPU 104 includes a processor core (core) 110 that executes programs. In some embodiments, the core 110 has a pipelined architecture. The MPU 104 further includes a core security controller (CSC) 112, which aids the MPU 104 in entering a secure mode for execution of secure programs on the core 110. The core security controller 112 may also monitor operation during secure mode to ensure secure operation, and during non-secure mode to prevent access to secure components of the system 100.

The core 110 may be any processor suitable for integration into a system on a chip (SoC), such as the ARM 1136 series of processors. In other embodiments, the core 110 may be a processor that includes some or all of the functionality of the core security controller 112 as described herein, such as the ARM 1176 series of processors. The ARM 1136 and 1176 technology may be obtained from ARM Holdings plc of Cambridge, United Kingdom, and/or ARM, Inc. of Austin, Tex., USA.

The system 100 also includes a digital signal processor (DSP) 106 coupled to the MPU 104 by way of the L3 bus/firewall 116. The DSP 106 aids the MPU 104 by performing task-specific computations, such as graphics manipulation and speech processing. The DSP 106 may have its own core and its own core security controller (not specifically shown). A graphics accelerator (GFX) 108 may also couple both to the MPU 104 and the DSP 106 by way of the L3 bus/firewall 116. The graphics accelerator 108 performs necessary computations and translations of information to allow display of information, such as on display device 142. The graphics accelerator 108, like the MPU 104 and the DSP 106, may have its own core and its own core security controller (not specifically shown). As with the MPU 104, both the DSP 106 and the graphics accelerator 108 may each independently enter a secure mode to execute secure programs on their respective cores.

The system 100 also includes a direct memory access controller (DMA CTLR) 122 coupled to on-chip memory (e.g., secure RAM 118 and secure ROM 120) and external memory (not specifically shown) by way of the L3 bus/firewall 116. The direct memory access controller 122 controls access to and from the on-chip memory and the external memory by any of the other system components such as, for example, the MPU 104, the DSP 106 and the graphics accelerator 108. The on-chip memory and external memory may be any suitable memory, such as synchronous RAM, RAMBUS™-type RAM, programmable ROMs (PROMs), erasable programmable ROMs (EPROMs), and electrically erasable programmable ROMs (EEPROMs). The on-chip memory may also include stacked memory, which may be any suitable memory that is integrated within the same semiconductor package as system-on-a-chip (SoC) 102, but on a semiconductor die separate from the semiconductor die of the system-on-a-chip 102.

The system 100 also includes various interfaces and components coupled to the various subsystems of the SoC 102 by way of the L4 bus/firewall 130. The interfaces include a USB interface (USB I/F) 124 that allows the system 100 to couple to and communicate with external devices, a camera interface (CAM I/F) 126 which enables camera functionality for capturing digital images, and a user interface (User I/F) 140A, such as a keyboard, keypad, or touch panel, through which a user may input data and/or messages. The components include a modem chipset 138 coupled to an external antenna 146, a global positioning system (GPS) circuit 128 likewise coupled to an external antenna 144, and a power management unit 134 controlling a battery 132 that provides power to the various components of the system 100.

Many of the components illustrated in FIG. 1, while also available as individual integrated circuits, may be integrated or constructed onto a single semiconductor die. Thus, the MPU 104, digital signal processor 106, memory controller 122, along with some or all of the remaining components, may be integrated onto a single die, and thus may be integrated into the system 100 as a single packaged component. Having multiple devices integrated onto a single die, especially devices comprising an MPU 104 and on-chip memory (e.g., secure RAM 118 and secure ROM 120), is generally referred to as a system-on-a-chip (SoC) 102 or a megacell. While using a system-on-a-chip may be preferred, obtaining the benefits of the systems and methods as described herein does not require the use of a system-on-a-chip.

Each of the core security controllers (e.g., core security controller 112) is implemented as a hardware-based state machine that monitors system parameters of each of the respective processor cores (e.g., core 110). A core security controller allows the secure mode of operation to initiate such that a processor may execute secure programs from secure memory (e.g., from a secure address range of the on-chip memory) and access secure resources (e.g., control registers for secure channels of the direct memory access controller 122). For more detailed description of embodiments of a core security controller, including the secure mode of operation, the signals that may be monitored to make the decision as to whether to enter the secure mode, and a state diagram for operation, reference may be had to United States Patent Application Publication No. 2003/0140245A1, published Jul. 24, 2003, which is assigned to the same Assignee as the present specification, and which is incorporated by reference herein as if reproduced in full below.

The various firewalls (e.g., the L3 bus/firewall 116 and the L4 bus/firewall 130) of the system 100 each provide additional protection beyond the protection provided by the core security controllers. A firewall blocks or allows access to a component of the system 100 by another component (or by software executing on that component) depending on a set of programmed rules. These rules establish relationships between pairs of components (i.e., system initiators and system targets) and the mode of operation (e.g., secure or non-secure). Such rules may be implemented either in hardware or software in the form of a permission table, wherein the component attempting access is crossed-referenced to an address range of the component to which access is desired. If the resulting permission for the requested operation and for the current mode of operation is a denial of access, the firewall signals a security violation.

The system 100 also includes buffer overflow protection logic (BOP) 200 coupled to the L3 bus/firewall 116 and the L4 bus/firewall 130. The buffer overflow protection logic 200, described more detail in relation to FIG. 2 below, monitors accesses to the execution stack 136 to detect and neutralize stack buffer overflow attacks. If the BOP 200 detects indications of a stack buffer overflow attack such as an attempt to fetch an instruction from the execution stack 136, an attempt to write to an execution stack location twice without an intervening read of that location, or an attempt to read an execution stack location twice without an intervening write to that location, it signals a security violation. If the core 110 includes functionality implementing a return stack or functionality that permits the execution stack 136 to be cached, this functionality should be deactivated when the BOP 200 is in use.

The firewalls (e.g., 116 and 130), the core security controllers (e.g., core security controller 112), the buffer overflow protection subsystem 200, and the attack indicator 144 each couple to the security controller 114. The security controller 114 acts as a hub for the detection of security violations, receiving security violation signals from the core security controllers, the firewalls, and the buffer overflow protection subsystem 200. If the security controller 114 receives a security violation signal, it may respond by alerting the user that a violation has been detected, such as by activating the attack indicator 144, by causing one or more core security controllers (e.g., core security controller 112) to initiate one or more security response sequences (described below), such as blocking the current access from reaching the target memory or target component, and/or by logging the source of the security violation. The attack indicator 144 may be a visible or audible (or both) indicator such as an LED or a buzzer.

The response of the security controller 114 is determined based on pre-selected options set when the system 100 is booted and/or on the source of the security violation signal (e.g., a firewall or the BOP 200). For example, if a firewall has already blocked an attempted illegal access, the security controller 114 may simply log the fact that the security violation occurred as no further action is needed. But, if the BOP 200 has detected an stack buffer overflow attack, the security controller may initiate one or more of the security response sequences depending on the configured response options set in the BOP 200 (explained in more detail in reference to FIG. 2 below). Exemplary embodiments of computer systems including a security controller, firewalls, and core security controllers are provided in U.S. patent application Ser. No. 10/961,344, entitled "System and Method of Identifying and Preventing Security Violations within a Computing System" which is hereby incorporated by reference.

The core security controller 112 may initiate one or more security response sequences when notified by the security controller 114 that a security violation has occurred. The available security response sequences include blocking or stopping execution of the violating operation, blocking future execution of the offending program (e.g., by deleting the program from the system 100), resetting the core 110, or notifying the core 110 to enter debug mode.

To block or stop execution of the violating operation, the core security controller 112 may abort an instruction presented to the core 110 by asserting a native processor hardware-based abort (e.g., a pre-fetch abort). The hardware-based abort prevents the offending instruction from executing and also may flush prefetch units, internal instruction and/or data prediction mechanisms, and pipeline stages of the core 110 that may contain additional program instructions that are part of a violation or attack. Such a flush causes the context of a malicious program to be cleared, which terminates execution of the program. Because the abort is hardware-based and not vulnerable to control or interference by software, a malicious program may have great difficulty intercepting or bypassing a security response sequence thus implemented.

To block future execution of the offending program, the core security controller 112 may generate an interrupt to the core 110 to trigger an interrupt service routine that launches one or more software programs (e.g., anti-virus software) that can identify the source of the malicious program and prevent future execution of the program (e.g. by deleting the source from the system 100). In some embodiments of the invention, a high-performance, high-priority processor interrupt may be used (e.g., the FIQ interrupt of the ARM 1136 or 1176 series processor) to trigger an interrupt service routine. This interrupt may also be implemented in the system such that the system will automatically enter secure mode before entering the interrupt service routine, thus guaranteeing that the interrupt service routine is protected from a software attack initiated in public mode (e.g., the secure FIQ of the ARM 1176 series processor).

To reset the core 110, the core security controller 112 causes a processor or warm reset signal to be sent to the core 110. To notify the core 110 to enter debug mode, the core security controller 112 causes a signal to be sent to the core 110 that causes the core 110 operate in a debug state.

Figure 2:
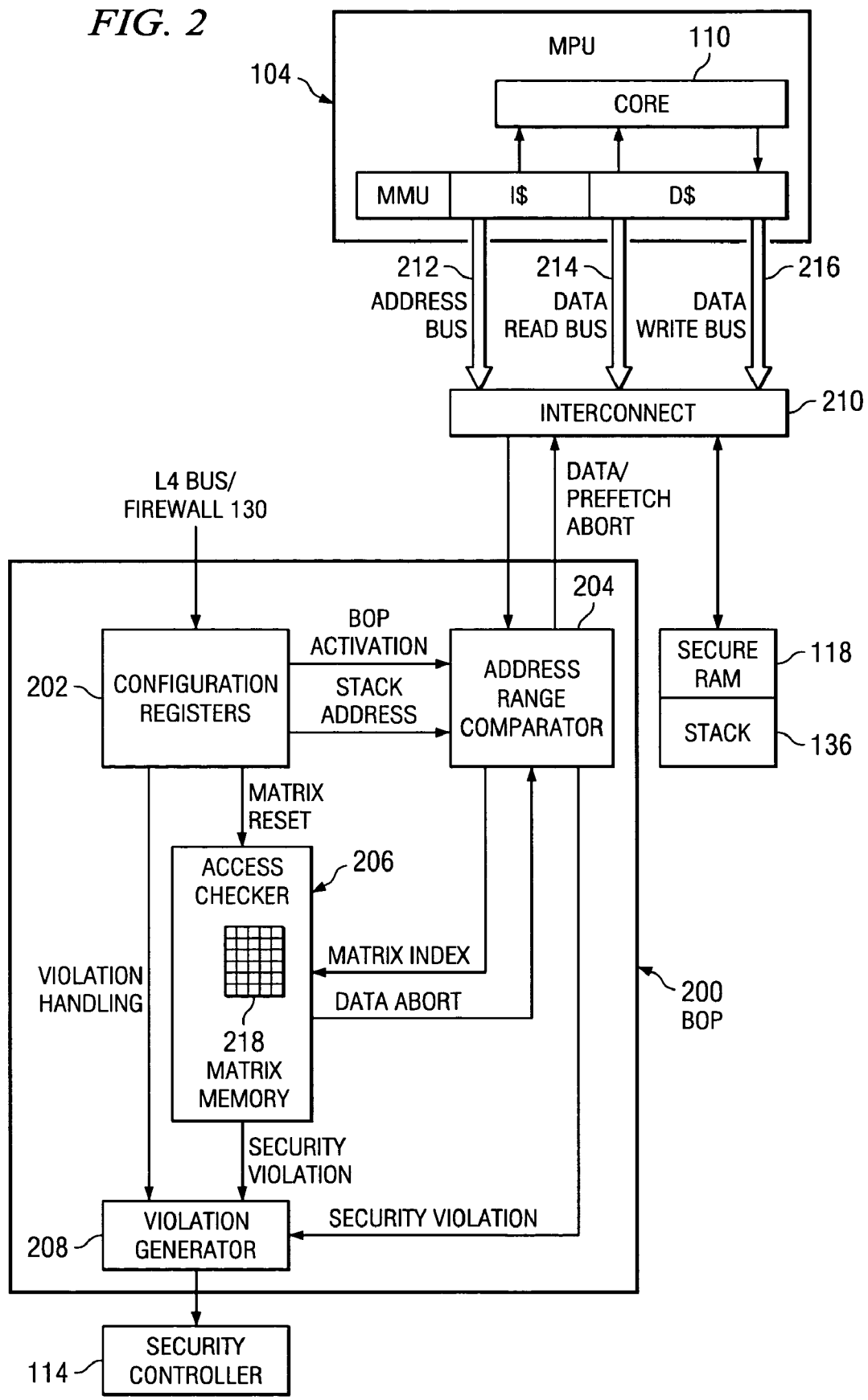
FIG. 2 shows a buffer overflow attack detection and neutralization subsystem in accordance with one or more embodiments.

FIG. 2 shows the BOP 200 and portions of the system 100 in greater detail. The BOP 200 is coupled to an interconnect 210 which is in turn coupled to an instruction bus 212, a data read bus 214, and a data write bus 216. The interconnect 210 creates data paths between system initiators such as the core 110 and system targets such as the secure RAM 118. The instruction bus 212 is used by the core 110 to fetch instructions for execution from the secure RAM 118. The data read bus 214 is the bus across which data reads from the secure RAM 118 propagate to the core 110. Likewise, data writes from the core 110 propagate along the data write bus 216 to the secure RAM 118. The interconnect 210 and the busses 212-216 are included in the L3 bus/firewall 116 of FIG. 1.

The BOP 200 includes configuration registers 202, address range comparator logic 204, access checker logic 206, and violation generator logic 208. The configuration registers 200, which may be set and/or changed through an interface to the L4 bus/firewall 130, include a BOP activation indicator, the physical start address of the execution stack 136, security violation handling configuration bits, and a matrix memory reset indicator. In some embodiments, the configuration registers 202 may also include the physical end address of the execution stack 136. The BOP activation indicator is used to enable or disable some of the functionality of the BOP 200. The matrix memory reset indicator is used to signal that the matrix memory 218 should be reset to all zeroes. This indicator is set when the system 100 is booted or re-initialized. The setting of the security violation handling configuration bits determines what security violation responses the violation generator 208 will require from the security controller 114 if a BOP security violation is detected. The requested security violation responses may be one or more of those responses previously described in reference to the security controller 114.

The address range comparator logic 204 monitors the busses 212-216 for requests to access the execution stack 136. If such an access request is detected on the instruction bus 212, a security violation notification is sent to the violation generator 208 and a prefetch abort is sent to the memory management unit (MMU) since executing instructions on the execution stack 136 is not allowed. If a stack access request is detected on the data read bus 214 or the data write bus 216, the address range comparator logic 204 generates an index from the address and sends that index to the access checker logic 206.

The access checker logic 206 maintains a stack access matrix in a dedicated local matrix memory 218. The matrix memory 218 is sized according to the size of the execution stack 136, including one bit for each byte in the execution stack 136. Initially, all of the bits in the matrix memory 218 are set to zero.

Using the index provided by the address range comparator logic 204, the access checker logic 206 checks the entry in the access matrix that corresponds to the address. If the access request is a write request and the corresponding matrix entry is a zero, the write access is allowed. The access checker logic 206 sets the matrix entry to a one to indicate that a write access (i.e., a stack push) has occurred at the corresponding location in the execution stack 136 and no further action is taken. Similarly, if the access request is a read request and the corresponding matrix entry is a one, the read access is allowed. The access checker logic 206 sets the matrix entry to a zero to indicate that a read access (i.e., a stack pop) has occurred at the corresponding location in the execution stack 136 and no further action is taken.

If the access request is a write request and the corresponding matrix entry is a one, indicating two write accesses to the same stack location without an intervening read access, the access checker logic 206 notifies the violation generator 208 of a security violation. Similarly, if the access request is a read request and the corresponding matrix entry is a zero, indicating two read accesses to the same stack location without an intervening write access, the access checker logic 206 notifies the violation generator 208 of a security violation. In addition, the access checker logic 206 notifies the address range comparator logic 204 that the requested access has not been allowed. The address range comparator logic 204 in turn notifies the core 110 that the requested access has not been allowed. In some embodiments, this notification is accomplished by sending a data abort indication that informs the core 110 of the occurrence of attempted illegal memory access.

In some embodiments, the BOP activation indicator in the configuration registers 202 is used to enable or disable the access checker logic 206 and the address range comparator logic 204. In such embodiments, if the BOP activation indicator is set to disable, the address comparator logic 204 does not monitor the instruction bus 212, the data read bus 214 and the data write bus 216, and the access checker logic 206 is inactive.

The violation generator logic 208 receives the security violation indications from the address range comparator logic 204 and the access checker logic 206 and determines what actions are to be taken in response to the security violation. This determination is made based on setting of the security violation handling configuration bits in the configuration registers 202. The violation generator logic 208 sends a notification to the security controller 114 that indicates a security violation has been detected by the BOP 200 and the response actions the security controller 114 should initiate in response to this BOP security violation.

In the embodiment of FIG. 2, the BOP 200 is represented as operating in parallel to the secure RAM 118 such that it does not immediately interfere with access requests to the secure RAM 118 and the execution stack 136. Instead, the BOP 200 is implemented such that it operates in fewer clock cycles than may be required to complete an access to the secure RAM 118, thus permitting an access request to be stopped before it occurs if the BOP 200 detects a security violation. In other embodiments, the BOP 200 may be implemented as an arbiter between the interconnect 210 and the secure RAM 118/execution stack 136 such that an access request is presented to the secure RAM 118 only if no security violation is detected by the BOP 200.

Figure 3:
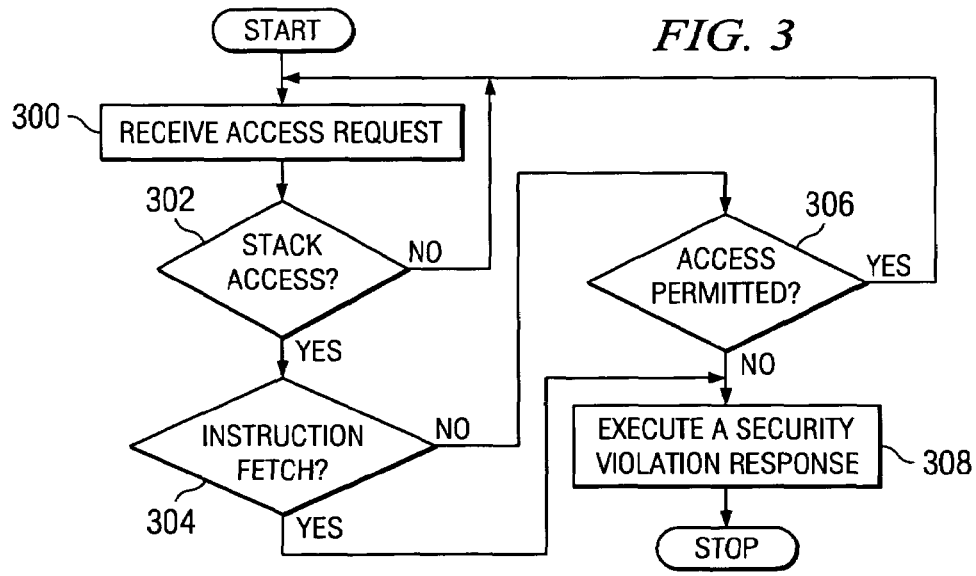
FIG. 3 is a flow chart of a method for detection and neutralization of buffer overflow attacks in accordance with one or more embodiments.

FIG. 3 is a flow chart of a method for detection and neutralization of buffer overflow attacks in accordance with one or more embodiments. Although the actions of this method are presented and described serially, one of ordinary skill in the art will appreciate that the order may differ and/or some of the actions may occur in parallel. The method begins with the receipt of a memory access request (block 300). A determination is made as to whether the memory access request is a request to access an execution stack (e.g., execution stack 136 of FIG. 1) (block 302). If the memory access request is not a request to access an execution stack, then the access is permitted. No other action is taken and the next memory access is considered (block 300). If the memory access request is a request to access an execution stack, a determination is made as to whether the access request is an attempt to fetch an instruction from the stack (block 304). If the memory access request is an instruction fetch request, it is treated as being indicative of a buffer overflow attack. A security violation response is executed during which action may be taken to neutralize the attack (block 308). This neutralization may include aborting the memory access request before it is completed.

If the memory access request is not an instruction fetch request, it is either a data read or a data write access request. A determination is made as to whether the access request type (i.e., read or write) is permitted at the stack location addressed in the access request (block 306). If the access request type is permitted, no further action is required and the next access request is processed (block 300). If the access request type is not permitted, a security violation response is executed during which action may be taken to neutralize the attack (block 308). This neutralization may include aborting the memory access request before it is completed.

The determination regarding where the access request type is permitted at the addressed stack location (block 306) is made as follows. If the access type is a read access and no write access has occurred since a previous read of the addressed stack location, which is indicative of two stack pop operations at the same location without an intervening push operation, the access is not permitted. The access is also not permitted if the access type is a write access and no read access has occurred since a previous write of the addressed stack location, which is indicative of two stack push operations at the same location without an intervening pop operation. If the access type is a read access following a previous write of the addressed stack location or a write access following a previous read of the addressed stack location, the access request is permitted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for detecting a stack buffer overflow attack, the method comprising:

receiving a memory access request from a processor core of a system;

determining that the memory access request addresses a location in an execution stack; and if the memory access request comprises a write request, determining if there has been no read request addressing the execution stack location since a previous write request addressing the execution stack location, if there has been no such read request, signaling a security violation indicating two write accesses to the same stack location without an intervening read access.

2. The method of claim 1, wherein determining that the memory access request indicates a stack buffer overflow attack further comprises:

determining that the memory access request addresses a location in an execution stack; and determining that the memory access request comprises an instruction fetch.

3. The method of claim 1, wherein determining that the memory access request indicates a stack buffer overflow attack further comprises:

determining that the memory access request addresses a location in an execution stack; and if the memory access request comprises a write request, determining that a write request indicator is stored in an index table at a table location indexed by an address of the memory access request.

4. The method of claim 3, further comprising:

determining that the memory access request does not indicate a stack buffer overflow attack, the determination comprising:

if the memory access request comprises a write request, determining that a read request indicator is stored in the table location; and storing the write request indicator in the table location.

5. The method of claim 1, further comprising:

determining that the memory access request addresses a location in an execution stack; and if the memory access request comprises a read request, determining that a read request indicator is stored in an index table at a table location indexed by an address of the memory access request.

6. The method of claim 5, further comprising:

determining that the memory access request does not indicate a stack buffer overflow attack, the determination comprising:

if the memory access request comprises a read request, determining that a write request indicator is stored in the table location; and storing the read request indicator in the table location.

7. The method of claim 1, further comprising executing a security violation response, in response to the security violation, comprising selecting at least two response options from a plurality of response options, the plurality of response options comprising preventing execution of an instruction within the processor core, asserting an interrupt signal to the processor core wherein security response software is executed in response to the asserted interrupt signal, asserting a warm reset signal to the processor core, causing the processor core to enter debug mode, and activating an attack indicator.

8. The method of claim 1, further comprising:

blocking or stopping the memory access request if there has been no read request addressing the execution stack location since a previous write request addressing the execution stack location.

9. A method for detecting a stack buffer overflow attack, the method comprising:

receiving a memory access request from a processor core of a system; and determining that the memory access request addresses a location in an execution stack; and if the memory access request comprises a read request, determining if there has been no write request addressing the execution stack location since a previous read request addressing the execution stack location, if there has been no such write request, signaling a security violation indicating two read accesses to the same stack location without an intervening write access.

10. The method of claim 9, further comprising:

blocking or stopping the memory access request if there has been no write request addressing the execution stack location since a previous read request addressing the execution stack location.

11. The method of claim 9, wherein determining that the memory access request indicates a stack buffer overflow attack further comprises:

determining that the memory access request addresses a location in an execution stack; and if the memory access request comprises a write request, determining that a write request indicator is stored in an index table at a table location indexed by an address of the memory access request.

12. The method of claim 11, further comprising:

determining that the memory access request does not indicate a stack buffer overflow attack, the determination comprising:

if the memory access request comprises a write request, determining that a read request indicator is stored in the table location; and storing the write request indicator in the table location.

13. The method of claim 9, further comprising:

determining that the memory access request addresses a location in an execution stack; and if the memory access request comprises a read request, determining that a read request indicator is stored in an index table at a table location indexed by an address of the memory access request.

14. The method of claim 13, further comprising:

determining that the memory access request does not indicate a stack buffer overflow attack, the determination comprising:

if the memory access request comprises a read request, determining that a write request indicator is stored in the table location; and storing the read request indicator in the table location.

15. The method of claim 9, further comprising executing a security violation response, in response to the security violation, comprising selecting at least two response options from a plurality of response options, the plurality of response options comprising preventing execution of an instruction within the processor core, asserting an interrupt signal to the processor core wherein security response software is executed in response to the asserted interrupt signal, asserting a warm reset signal to the processor core, causing the processor core to enter debug mode, and activating an attack indicator.

16. A system, comprising:

a processor core coupled to a plurality of busses;

an execution stack in a random access memory coupled to the plurality of busses;

a buffer overflow protection (BOP) logic coupled to the plurality of busses, the BOP logic receiving memory access requests from the plurality of busses, and wherein the BOP logic is operable to detect a buffer overflow attack if the memory access request comprises a read request to a location in the execution stack and a previous memory access request addressing the location was a read request, and signal a security violation if the previous memory access request addressing the location was a read request indicating two read accesses to the same stack location without an intervening write access.

17. The system of claim 16, wherein the BOP logic is further operable to store a write request indicator in an index table at a table location indexed by an address of the memory access request if the memory access request comprises a write request.

18. The system of claim 16, wherein the BOP logic is operable to detect a buffer overflow attack if the memory access request comprises a write request, and a write request indicator is stored in an index table at a table location indexed by an address of the memory access request.

19. The system of claim 16, wherein the BOP logic is further operable to store a read request indicator in an index table at a table location indexed by an address of the memory access request if the memory access request comprises a read request.

20. The system of claim 16, wherein the BOP logic is operable to detect a buffer overflow attack if the memory access request comprises a read request, and a read request indicator is stored in an index table at a table location indexed by an address of the memory access request.

21. The system of claim 16, further comprising executing a security violation response, in response to the security violation, comprising selecting at least two response options from a plurality of response options, the plurality of response options comprising presenting an instruction abort sequence to the processor core, asserting an interrupt signal to the processor core wherein security response software is executed in response to the asserted interrupt signal, asserting a warm reset signal to the processor core, causing the processor core to enter debug mode, and activating an attack indicator.

22. A system, comprising:
a processor core coupled to a plurality of busses;
an execution stack in a random access memory coupled to the plurality of busses; and
a buffer overflow protection (BOP) logic coupled to the plurality of busses, the BOP logic receiving memory, access requests from the plurality of busses, and
wherein the BOP logic is operable to detect a buffer overflow attack if the memory access request comprises a write request to a location in the execution stack and a previous memory access request addressing the location was a write request, and signal a security violation if the previous memory access request addressing the location was a write request indicating two write accesses to the same stack location without an intervening read access.

23. The system of claim 22, wherein the BOP logic is further operable to store a write request indicator in an index table at a table location indexed by an address of the memory access request if the memory access request comprises a write request.

24. The system of claim 22, wherein the BOP logic is operable to detect a buffer overflow attack if the memory access request comprises a write request, and a write request indicator is stored in an index table at a table location indexed by an address of the memory access request.

25. The system of claim 22, wherein the BOP logic is further operable to store a read request indicator in an index table at a table location indexed by an address of the memory access request if the memory access request comprises a read request.

26. The system of claim 22, wherein the BOP logic is operable to detect a buffer overflow attack if the memory access request comprises a read request, and a read request indicator is stored in an index table at a table location indexed by an address of the memory access request.

27. The system of claim 22, further comprising executing a security violation response, in response to the security violation, comprising selecting at least two response options from a plurality of response options, the plurality of response options comprising presenting an instruction abort sequence to the processor core, asserting an interrupt signal to the processor core wherein security response software is executed in response to the asserted interrupt signal, asserting a warm reset signal to the processor core, causing the processor core to enter debug mode, and activating an attack indicator.

28. A buffer overflow protection (BOP) apparatus, comprising:
address range comparator logic coupled to a plurality of busses of a processor core to receive a memory access request from a program executing on the processor core; and
violation generator logic coupled to the address comparator logic to receive a notification of a security violation, wherein the address comparator logic sends the notification to the violation generator logic if the memory access request comprises an instruction fetch request addressing an execution stack indicating two write accesses to the same stack location without an intervening read access or two read accesses to the same stack location without an intervening write access.

29. The BOP apparatus of claim 28, further comprising:
access checker logic coupled to the address comparator logic and the violation generator logic,
wherein the access checker logic sends the notification to the violation generator if the memory access request comprises a write request addressing a location in the execution stack and a previous memory access request addressing the location comprised a write request.

30. The BOP apparatus of claim 29, wherein the access checker logic sends the notification to the violation generator if the memory access request comprises a read request addressing the location and a previous memory access request addressing the location comprised a read request.

* * * * *

UNITED STATES PATENT AND TRADEMARK OFFICE
CERTIFICATE OF CORRECTION

| | | |
|---|---|---|
| PATENT NO. | : 7,669,243 B2 | Page 1 of 1 |
| APPLICATION NO. | : 11/199427 | |
| DATED | : February 23, 2010 | |
| INVENTOR(S) | : Gregory R. Conti | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Fourth Day of January, 2011

David J. Kappos
*Director of the United States Patent and Trademark Office*